(12) United States Patent
Guyot

(10) Patent No.: US 7,016,693 B2
(45) Date of Patent: Mar. 21, 2006

(54) METHOD AND APPARATUS FOR REPORTING LOCATION OF A MOBILE TERMINAL

(75) Inventor: Olivier Guyot, Helsinki (FI)

(73) Assignee: Nokia Corporation, Espoo (FI)

( * ) Notice: Subject to any disclaimer, the term of this patent is extended or adjusted under 35 U.S.C. 154(b) by 162 days.

(21) Appl. No.: 10/753,055

(22) Filed: Jan. 6, 2004

(65) Prior Publication Data

US 2005/0148340 A1 Jul. 7, 2005

(51) Int. Cl.
*H04Q 7/20* (2006.01)
(52) U.S. Cl. ............................. 455/456.2; 455/456.1
(58) Field of Classification Search ............ 455/456.1, 455/456.2, 404.2, 433, 435, 456.6; 709/203, 709/201; 340/539.13, 539.15, 539.32; 342/450, 342/457, 357; 701/200, 207, 208
See application file for complete search history.

(56) References Cited

U.S. PATENT DOCUMENTS

| | | | | |
|---|---|---|---|---|
| 6,272,342 B1 * | 8/2001 | Havinis et al. | ............. | 455/433 |
| 6,385,458 B1 * | 5/2002 | Papadimitriou et al. | . | 455/456.2 |
| 6,463,289 B1 * | 10/2002 | Havinis et al. | .......... | 455/456.4 |
| 2002/0086682 A1 * | 7/2002 | Naghian | ..................... | 455/456 |
| 2004/0127229 A1 * | 7/2004 | Ishii | ........................ | 455/456.1 |
| 2004/0185870 A1 * | 9/2004 | Matsuda | .................. | 455/456.1 |
| 2004/0258012 A1 * | 12/2004 | Ishii | ........................... | 370/328 |

FOREIGN PATENT DOCUMENTS

WO  WO 01/41468  11/2000

OTHER PUBLICATIONS

3GPP TS 25.305, V5.8.0 (Dec. 2003), 3rd Generation Partnership Project; Technical Specification Group Radio Access Network; Stage 2 functional specification of User Equipment (UE) positioning in UTRAN (Release 5) (as published on the Internet).
3GPP TS 25.413, V.5.6.0 (Sep. 2003), Section 8.20.2 Location Report (as published on the Internet).
25.305CR 099 3GPP TSG-RAN WG2 Meeting #39, San Diego, USA, 17th-21st Nov. ,2003, Change Request 25. 305CR 099 rev 1, current version 3.10.0 (as published on the Internet).
25.413CR 6083 3GPP TSG-RAN WG2 Meeting #39, San Diego, USA, 17th-21st Nov. ,2003, Change Request 25. 413CR 608 rev , current version 5.6.0 (as published on the Internet).
TS 23.271 v 6.5.0 (Sep. 2003), Technical Specification, 3rd Generation Partnership Project; Technical Specification Group Services and System Aspects; Functional stage 2 description of LCS (Release 6) (as published on the Internet).

* cited by examiner

*Primary Examiner*—Jean Gelin
(74) *Attorney, Agent, or Firm*—Ware, Fressola, Van Der Sluys & Adolphson LLP

(57) ABSTRACT

A method for use by a wireless communication network (18) in responding to a request (b) originating from a requester (19) for an estimate of the position of a mobile terminal (11)—the request provided via an LCS server (16*a*)—along with a requested accuracy, the method including a step in which a controller (12*b*) of the radio access network (12) by which the mobile terminal (11) is coupled to the cellular network (18) provides a response (h) to the request including not only the position/location estimate but also either the accuracy of the estimate in a form directly useable by the LCS server (e.g. in same form as the requested accuracy), or an accuracy fulfillment indicator, i.e. an indication of whether the accuracy of the estimate is at least as good as the requested accuracy.

12 Claims, 3 Drawing Sheets

METHOD AND APPARATUS FOR REPORTING LOCATION OF A MOBILE TERMINAL

TECHNICAL FIELD

The present invention pertains to the field of providing location for (i.e. to provide an estimate of the position of) mobile terminals. More particularly, the present invention pertains to providing an indication of the accuracy of a location along with the location.

BACKGROUND ART

In 3GPP (Third Generation Partnership Program), for both UMTS (Universal Mobile Telecommunication System) and GSM/EDGE (Global System for Mobile Communication/Enhanced Data rates for GSM Evolution) systems, an LCS (Location Communication System) client (i.e. a client application hosted by either a mobile station/user equipment including a mobile terminal or by a non-mobile device operated by a user who wants to know the location of a mobile station) can request an LCS server (provided by/or coupled to a corresponding operator network) to provide a position estimate to the client, either for the device hosting the client itself or for some other equipment (a mobile station). For example, a mobile station may itself ask (as an LCS client) for an estimate of its own location/position, or an application hosted by a computer linked to the Internet and ultimately to an LCS server, may send a request to the LCS server for an estimate of the location/position of a mobile station (a request that would be honored usually only if the user of the application has been authorized to receive such information). In either case, the location/position estimate to be provided is an estimate of the position of a mobile station communicatively coupled to an operator network via a radio access network (RAN), which in turn includes or is coupled to the LCS server.

One way for an LCS server to provide a location estimate for (i.e. to provide an estimate of the position of) a mobile station in response to a request from an LCS client is to obtain it from the RAN by which the mobile station is communicatively coupled to one or another operator network. The LCS client can request that the position estimate be given within a certain response time and so as to have a specified accuracy, which may be indicated by specifying a Quality of Service (QoS). During recent 3GPP TSG (Technical Specification Group) RAN WG2 (Working Group Two) and WG3 #39 meetings, it was approved that in all releases from Rel-99 onwards, UTRAN (UMTS Terrestrial Radio Access Network) will always return a location/position estimate, in response to a request for same, with the best achievable accuracy even if a requested accuracy indicated in the request is not achieved. Thus, a position estimate is to be returned to the LCS client even if it does not have the requested accuracy. It would be advantageous to provide to the LCS client not only the location estimate, but also an indication as to whether the location estimate has the requested accuracy, but the standard MLP (Mobile Location Protocol) interface between an LCS server and an LCS client does not allow this. However, an LCS server may not have all the information or capabilities in place needed to determine if a requested accuracy has been achieved for a location estimate made by a RAN.

Currently, an LCS client can specify a requested accuracy to an LCS server in terms of a number of e.g. meters, and in response to the request (after it having been forwarded by the LCS to the appropriate RAN), the LCS server receives a confidence area from the appropriate RAN (the RAN to which the mobile whose position is being estimated is coupled) in terms of a shape (typically the shape of a cell, e.g. a polygon or ellipsoid). In order to determine whether a location estimate has the specified accuracy, the LCS server would have to perform a calculation to determine if the confidence area (shape) is such as to provide the requested accuracy. An LCS server may not have all of the information necessary to make such a calculation; to do so, in general, the LCS server would have to have information regarding the shapes in use as different RAN cells. On the other hand, it is likely that a RAN would have such information, or, at the least, it is reasonable to implement upgrades to RAN equipment to be able to relate confidence shapes to requested accuracy or to otherwise determine whether a location estimate has a requested accuracy.

DISCLOSURE OF THE INVENTION

In view of the above considerations, in a first aspect of the invention a method is provided for use by a wireless communication network including a radio access network and also including a core network in turn including a LCS server, in responding to a request originating from a LCS client for a location estimate of a mobile terminal coupled to the core network via a controller of the radio access network, the request including a requested accuracy, the radio access network including means for carrying out location measurements of the mobile terminal in response to the request as provided by the LCS server so as to provide a location estimate and an associated accuracy, the method characterized by: a step in which the controller, in response to the request, provides a response indicating the location estimate and including either a binary indicator indicating the associated accuracy relative to the requested accuracy or including the associated accuracy in the same terms as those in which the LCS server provided the requested accuracy in the request.

In accord with the first aspect of the invention, the LCS client may reside external to the core network. Further, the LCS client may be an application hosted by a device remote from the mobile terminal. Also further, the LCS client may be a user equipment device including the mobile terminal.

Also in accord with the first aspect of the invention, the LCS client may reside in the core network.

Also in accord with the first aspect of the invention, the LCS client may be a controller of the radio access network.

In a second aspect of the invention, a computer program product is provided comprising: a computer readable storage structure embodying computer program code thereon for execution by a computer processor included as part of the equipment of the controller, with said computer program code characterized in that it includes instructions for performing a method according to the first aspect of the invention.

In a third aspect of the invention, an apparatus is provided for use by a wireless communication network including a radio access network and also including a core network in turn including a LCS server, in responding to a request originating from a LCS client for a location estimate of a mobile terminal coupled to the core network via a controller of the radio access network, the request including a requested accuracy, the radio access network including means for carrying out location measurements of the mobile terminal in response to the request as provided by the LCS server so as to provide a location estimate and an associated accuracy, the apparatus characterized by: means by which the controller, in response to the request, provides a response indicating the location estimate and including either a binary indicator indicating the associated accuracy relative to the requested accuracy or including the associated accuracy in the same terms as those in which the LCS server provided the requested accuracy in the request.

In a fourth aspect of the invention, a system is provided, comprising: a core network of a wireless communication system, a mobile terminal, a radio access network for coupling the mobile terminal to the core network, characterized in that the radio access network includes an apparatus according to the third aspect of the invention.

BRIEF DESCRIPTION OF THE DRAWINGS

The above and other objects, features and advantages of the invention will become apparent from a consideration of the subsequent detailed description presented in connection with accompanying drawings, in which.

DETAILED DESCRIPTION OF THE INVENTION

Figure 1:
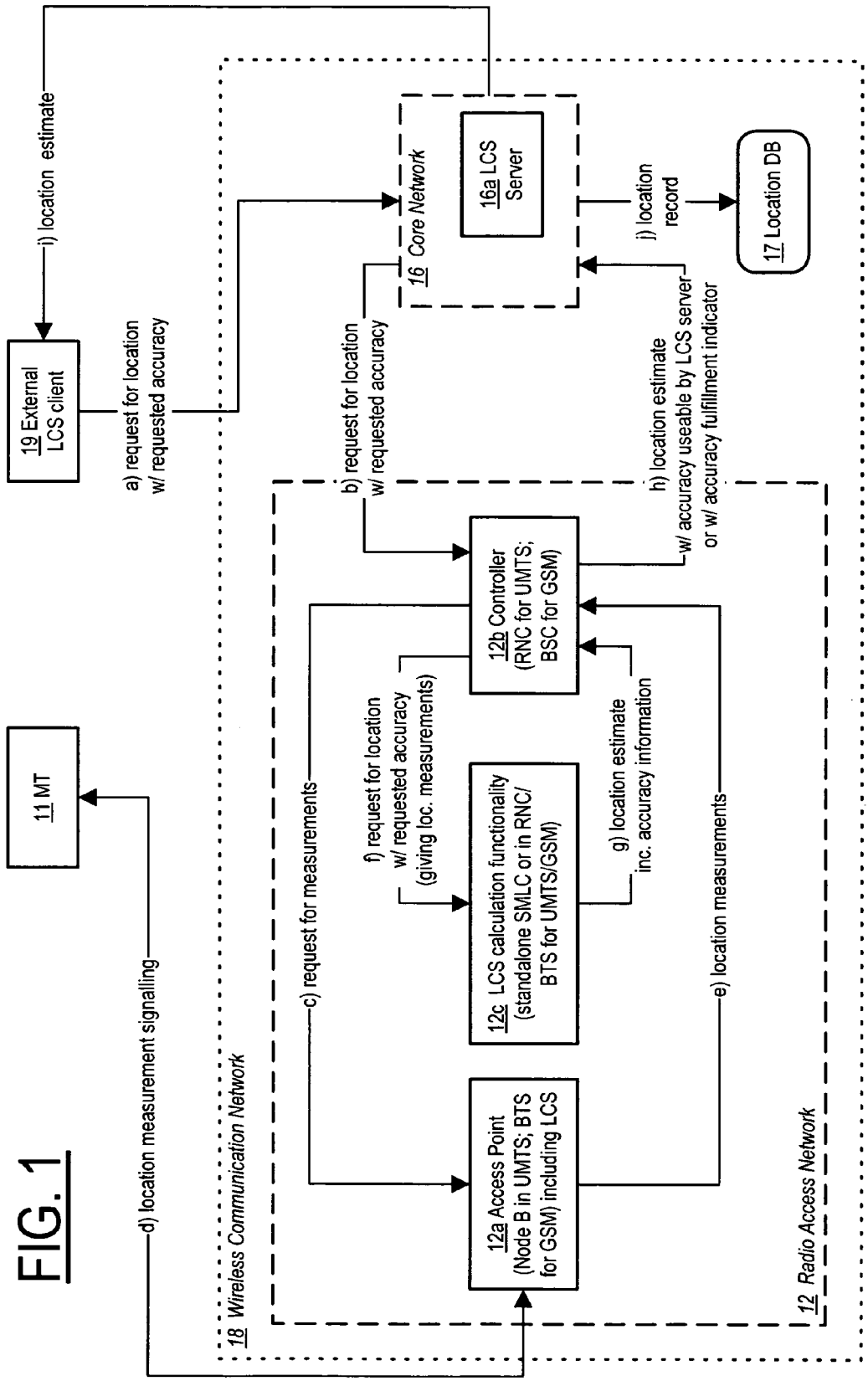
FIG. 1 is a block diagram/flow diagram of network elements and communication terminals involved in connection with a request for an estimate of the position of a mobile terminal, along with a requested accuracy, in the case where the request is originated by a so-called external location communication services client at a location different from that of the mobile terminal.

Referring now to FIG. 1, messaging according to the invention is shown in connection with a request (message "a") from an external LCS (Location Communication Service) client 19 for a LCS server 16a to provide an estimate, with a requested accuracy (i.e. to within an indicated accuracy), of the location/position of a MT (mobile terminal) 11 in a case where the requester LCS client 19 is distinct from the MT 11, i.e. is physically separated from the MT 11. The MT 11 is communicatively coupled to other communication terminals via a RAN (radio access network) 12 and then a core network 16, which includes the LCS server 16a. The MT 11, the RAN 12 and core network 16 are part of a wireless communication network 18. As in the prior art, the (external) LCS client 19 sends to the LCS server 16a the request for the location of the MT 11 along with a requested accuracy (e.g. in meters). The LCS server 16a, via other elements of the core network 16, communicates the request to the RAN 12 (as message "b"), and in particular to a controller 12b of the RAN. (The particular controller 12b to which the request is communicated is determined in general, using essentially the same facilities as are used in determining how to place a call to the MT 11, which could involve referring to a home location register in case the MT 11 is outside of its home area.) After initiating relevant requests, if any are needed, to the access point 12a for measurements (as message "c") and receiving them (as message "e"), the controller 12b then communicates (in a message "f") the request to the LCS calculation functionality 12c of the RAN 12, appropriate for estimating the position of the MT 11, based on those additional measurements requested to the access point and typically involving signaling with the MT 11, shown as location measurement signaling and indicated as messaging "d". (The LCS calculation functionality 12c of the RAN can either be integrated in the controller 12b or can exist as a standalone network element.) The LCS calculation functionality 12c of the RAN 12 then determines an estimate of the position/location of the MT 11 and a corresponding accuracy of the estimate according to methods and techniques not the subject of the invention.

Now after the LCS calculation functionality 12c of the RAN 12 has received the request and has determined a location estimate according to methods and techniques not the subject of the invention, the LCS calculation functionality provides (in the message "g") an actual accuracy associated with the location estimate. According to the invention, either the LCS calculation functionality 12c of RAN or the controller 12b then expresses the accuracy in terms allowing the LCS server 16a to determine by direct comparison whether the location estimate has the accuracy requested by the LCS client 19. For example, if the controller 12b receives accuracy information from the LCS calculation functionality 12c in terms of a geometric shape (e.g. an ellipsoid), and the LCS server 16a requested the position estimate using accuracy in terms of meters, the LCS functionality determines the associated accuracy in terms of meters using the information provided by the access points. (Of course the LCS calculation functionality can provide an actual accuracy in terms understandable by the LCS server 16a, however not knowing the requested accuracy, the LCS calculation functionality cannot provide any indication of whether the achieved accuracy is at least as good as the requested accuracy.)

With an actual accuracy in hand, and in terms allowing the LCS server 16a to compare it directly (without further conversions or calculations) to the requested accuracy, the controller 12b provides to the LCS server 16a (as message "h") the location estimate and either the accuracy in the form useable by the LCS server 16a, i.e. allowing direct comparison with the requested accuracy, or an indication of whether the accuracy (achieved) is at least as good as the requested accuracy, i.e. what is here called an accuracy fulfillment indicator/flag. In the former case, the LCS server 16a then determines whether the location estimate has the requested accuracy, and in either case, the LCS server then provides the location estimate (but not necessarily also the associated/usable accuracy) to the (external) LCS client 19 (as message "i"). (In addition, the LCS Server 16a or more generally the Core Network 16 can store the location estimate and the associate/usable accuracy—or the indication that the accuracy is at least as good as an indicated requested accuracy—in a location database 17—via a message "j"—for possible reuse in case of a later-made request for the location of the MT 11 with a requested accuracy. Such reuse would obviously be made only in case of some information sufficient to indicate that the location on file is valid at the time of the later-made request.)

Thus, according to the invention, the LCS server 16a receives and understands not only a location estimate (regardless of whether it has the requested accuracy), but also the accuracy of the estimate, and in a form allowing direct comparison with the requested accuracy, or an indication of whether the accuracy of the location estimate is at least as good as the requested accuracy (i.e. the accuracy fulfillment indicator/flag). The LCS server 16a can then use the accuracy information to, e.g. not bill the LCS client for a service not performed (e.g. providing a location estimate with an accuracy worse than requested). The LCS server 16a could also provide the accuracy to the LCS client 19, which would be useful in some situations (probably especially in a different context, one in which the LCS client is the MT 11 itself, or is a search and rescue or police authority attempting to locate the MT 11 in an emergency situation).

Although FIG. 1 seems also to be restricted to a case in which the LCS client 19 communicates its request to the LCS server 16*a* via a communication path not including the RAN 12, it should be understood that the communication path connecting the LCS server and the LCS client 19 could include the RAN 12 (but FIG. 1 does not so indicate, in order that it also represent cases where the communication path does not include the RAN).

As a possible scenario corresponding to the messaging illustrated in FIG. 1, the LCS client 19 is for example an application hosted by a terminal configured to communicate with the LCS server 16*a* via e.g. the Internet (or via a circuit-switched connection), and having been given the right by the owner of the mobile terminal 11 to obtain location information for the mobile terminal. More specifically for example, the owner of the mobile terminal may have given a friend the right to ask for and receive an estimate of the location of the mobile terminal.

Figure 2:
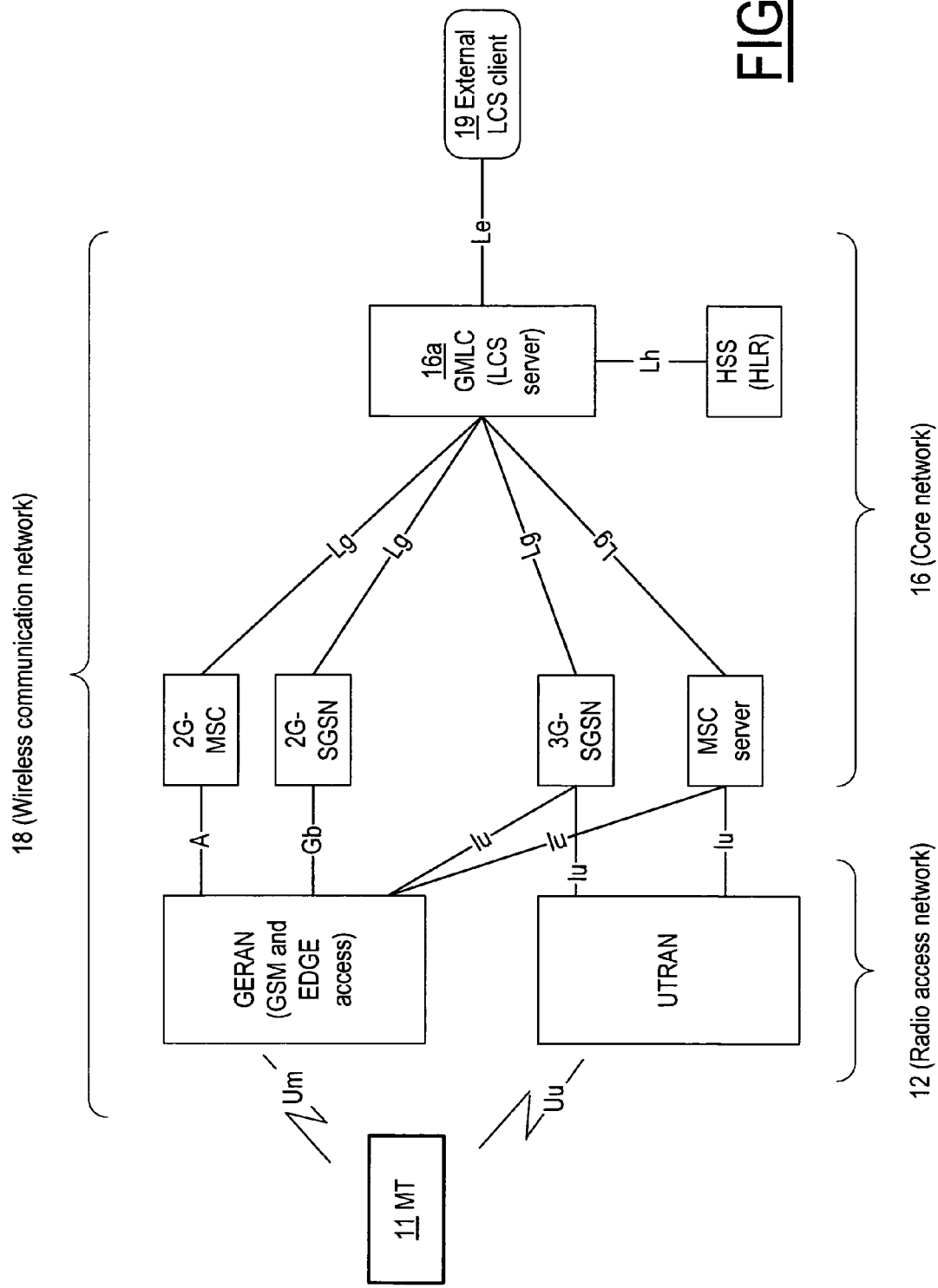
FIG. 2 is a block diagram showing the architecture of FIG. 1 in somewhat more detail.

FIG. 2 is another perspective of the architecture of FIG. 1. As shown in FIG. 2, the RAN 12 can be e.g. a GERAN (GSM EDGE RAN), having a so-called Um interface with the MT 11, or a UTRAN having a so-called Uu interface with the MT 11. In interfacing with the core network 16, GERAN interfaces with a 2G MSC via a so-called A interface, and with a 2G SGSN (serving GPRS support node) via a so-called Gb interface. GERAN Iu-mode from release 5 onwards also interfaces with a 3G SGSN and MSC via a Iu interface. For UTRAN, the interface to the core network 16 is to a 3G SGSN via a Iu interface, or with a MSC also via an Iu interface. The 2G and 3G SGSNs and MSCs interface with a GMLC (gateway mobile location center)—i.e. the LCS server 16*a*—via a so-called Lg interface. FIG. 2 also shows the GMLC interfacing with the external LCS client 19 of FIG. 1 (i.e. distinct from the MT 11) via a so-called Le interface, and with the HSS (home subscriber server), which includes an HLR (home location register) via an Lh interface.

The terminology "LCS client" in general indicates a logical function that can reside in one or another entity depending on the scenario, as provided in table 6.1 and 6.2 of TS 23.271 (v580), where it is explained that the "Location Client Function" can reside the core network (and in particular, in a MSC or SGSN), in which case it is said to be internal (to the core network), or in UE (user equipment, i.e. the equipment including the MT 11) or any other communication terminal external to the core network, in which case it is said to be external.

The messaging illustrated in FIG. 1 is an example of what is referred to as a mobile-terminating (according to 3GPP TS 23.271) location request (MT LR). The invention is also of use in case of what is called a mobile-terminating deferred location request, which is the same as shown in FIG. 1, except that the core network 16 (i.e. the MSC or SGSN) sends the request to RAN only when a certain event happens. Moreover, the invention is also of use in case of what is called a network-induced location request, in which for example the core network 16 (i.e. the MSC or SGSN), as a so-called internal LCS client, makes a request for the location of the mobile terminal 11 (e.g. as a result of a 911 call from the mobile terminal), and also in case of what is called a mobile-originating (according to 3GPP TS 23.271) location request, in which, as already mentioned, the mobile terminal (as an external LCS client) makes an actual location request (for its own location).

In case of a network-induced location request, the network is the originator of the request, i.e. the CN (MSC/SGSN) originates the request and sends it to the RAN, and upon receiving a location estimate (and accuracy or accuracy information), provides the location estimate and the accuracy or accuracy flag to the LCS server/GMLC, which might forward the information (location estimate and accuracy or accuracy flag) to an emergency services LCS client. For example, a user of the MT 11 might call an emergency assistance number (e.g. "911"), and in order to provide assistance, the core network can be configured so as to make (or allow an operator to make) a location request with a requested accuracy to help authorities or rescuers locate the user of the MT 11.

In case of a mobile-originating location request, the location request is initiated by a user via the UE including the MT 11, and the MT 11 communicates the request and a requested accuracy to the CN (MSC or SGSN) via RAN (transparently). Different types of location services can be requested, including for example: having an estimate of the position of the MT 11 returned to the MT 11, or having an estimate of the position of the MT 11 sent to some other external LCS client. In either case, RAN reports to the core network 16 (MSC or SGSN), which in turn either forwards it to the MT 11 or to some other external LCS client via the LCS server 16*a*/GMLC. (So in case the request is originated by the MT 11 and is for the position of the MT 11 itself, the location/position estimate is sent from the RAN to the CN and possibly to the LCS server—see FIG. 9.7 in 23.271 v5.8.0, section 9.2.1, for example—and then back through the RAN to the MT 11, but typically without the accuracy information, although the additional information could also be sent from the CN to MT.)

Figure 3:
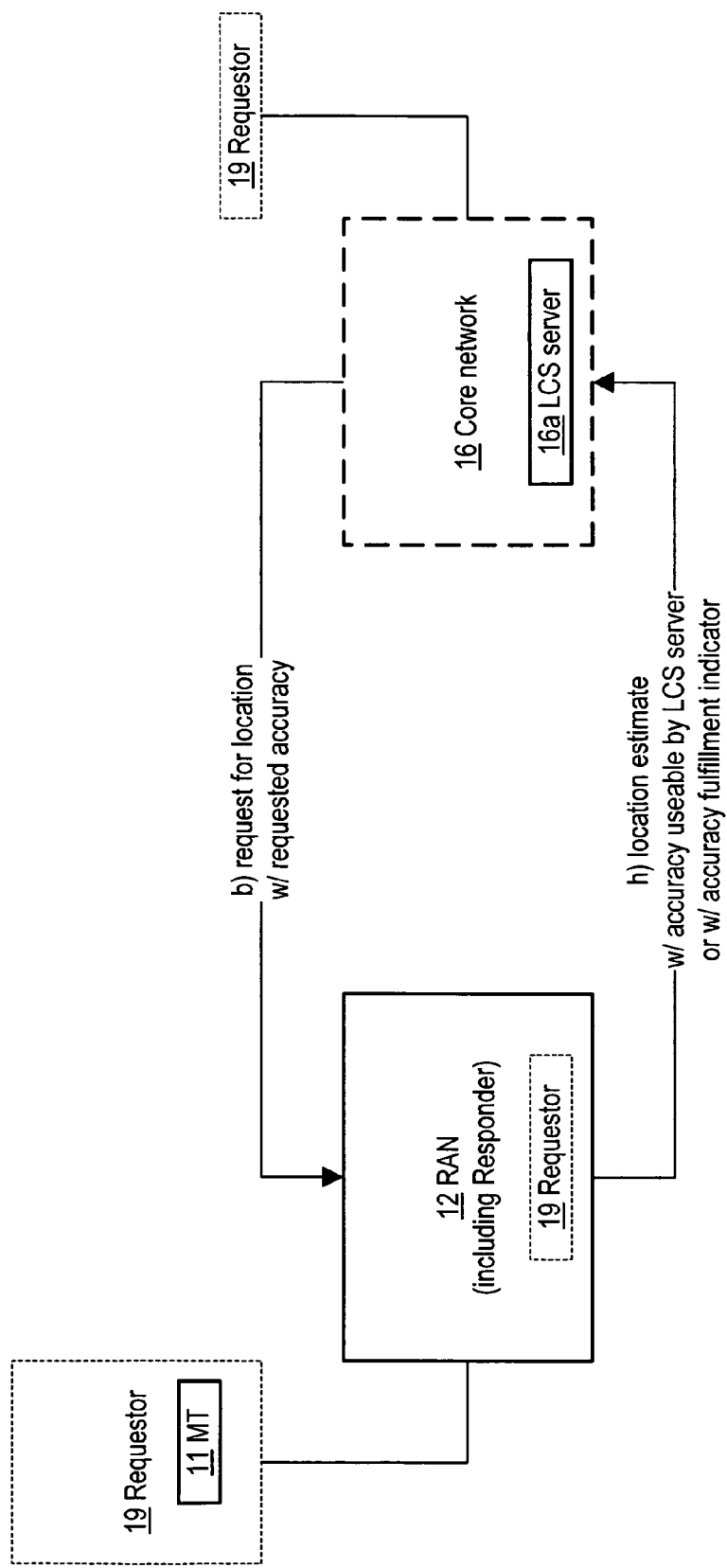
FIG. 3 is a block diagram/flow diagram illustrating the fundamental messaging according to the invention, and illustrating various possible different sources of a request for an estimate of the position of a mobile terminal.

Thus, and more generally according to the invention and now referring to FIG. 3 as well as to FIG. 1, a responder 12—an LCS control function in a RAN 12, i.e. an integrated or external SMLC (serving mobile location center) in UTRAN or GERAN—receives from a requestor 19 (which may reside in various locations, all indicated in FIG. 3 in dashed outline), via the core network 16 including the LCS server 16*a*, a location request for the MT 11, along with a requested accuracy (including some indication of the means by which the accuracy is being expressed, such as e.g. meters) and the responder 12 then calculates or otherwise determines an estimate of the position of the mobile terminal, and provides to the core network 16 (and in particular to the LCS server 16*a*) a message bearing the estimate of the position and also bearing: either an indication as to whether the position estimate has the requested accuracy, or the accuracy of the position estimate given in the same terms (form) as was used by the network element B to indicate the requested accuracy (so as to be able to be compared directly with the requested accuracy). As shown in FIG. 3, the location request always arrives at the RAN 12 from the core network 16 (SGSN/MSC) via the Iu interface (for UMTS and GERAN Iu-mode) or the A/Gb interfaces (for GERAN A/Gb mode), but the requester may reside either within a UE hosting the MT 11 whose location is being estimated, which is one example of an external LCS client, or may reside in the core network 16, or may reside in some other device as some other external LCS client (distinct from the UE hosting the MT 11), and not necessarily connected to the core network via the RAN 12 or any other RAN, but instead, e.g. via the Internet.

The uses of the invention mentioned above—in case of providing emergency assistance and in ensuring that an LCS client is not billed for a service not provided—are only examples. In connection with emergency assistance, though, since as set out in Rel-6 23.271 v650 (in section 9.1.5A), if the GMLC is capable of determining whether an initial location estimate satisfies the accuracy requirements for an emergency call then it may not need to request a higher accuracy location, the invention is of use in particular in allowing the GMLC to sometimes avoid having to make a location request in case of an emergency call when a location estimate already obtained is sufficiently accurate.

The invention has been described in terms (primarily) as the sending of a message from the controller 12b to the LCS server 16a of the core network 16 (typically via other elements of the core network) communicating a location estimate along with a statement of the accuracy of the location estimate in a form in which the LCS server can use to determine whether a corresponding requested accuracy was achieved. The invention also comprehends one or more devices for providing the message. For example, the invention comprehends equipment within the LCS calculation functionality 12c by which to receive the location measurements made by equipment in the access point 12a, and to calculate the location estimate and determine its accuracy in terms useable by the LCS server 16a. The determination of the accuracy in terms useable by the LCS server 16a may also be done by the controller 12b, which prepares and sends the message to the core network 16. Some or all of the functionality of each of the devices can be implemented as hardware, or may be implemented as software or firmware for execution by a processor. Thus, the invention also encompasses a computer program product including a computer readable storage structure embodying computer program code—i.e. the software or firmware—thereon for execution by a computer processor provided with the controller 12b and the LCS calculation functionality 12c.

It is to be understood that the above-described arrangements are only illustrative of the application of the principles of the present invention. Numerous modifications and alternative arrangements may be devised by those skilled in the art without departing from the scope of the present invention, and the appended claims are intended to cover such modifications and arrangements.

What is claimed is:

1. A method, for use by a wireless communication network including a radio access network and also including a core network in turn including a location communication service (LCS) server, in responding to a request originating from a LCS client for a location estimate of a mobile terminal coupled to the core network via a controller of the radio access network, the request including a requested accuracy, the radio access network including means for carrying out location measurements of the mobile terminal in response to the request as provided by the LCS server so as to provide a location estimate and an associated accuracy, the method characterized by:
a step in which the controller, in response to the request, provides a response indicating the location estimate and including either a binary indicator indicating the associated accuracy relative to the requested accuracy or including the associated accuracy in the same terms as those in which the LCS server provided the requested accuracy in the request.

2. The method of claim 1, wherein the LCS client resides external to the core network.

3. The method of claim 2, wherein the LCS client is an application hosted by a device remote from the mobile terminal.

4. The method of claim 2, wherein the LCS client is a user equipment device including the mobile terminal.

5. The method of claim 1, wherein the LCS client resides in the core network.

6. The method of claim 1, wherein the LCS client is a controller of the radio access network.

7. A computer program product comprising: a computer readable storage structure embodying computer program code thereon for execution by a computer processor included as part of controller of the radio access network, with said computer program code characterized in that it includes instructions for performing the method of claim 1.

8. An apparatus, for use by a wireless communication network including a radio access network and also including a core network in turn including a location communication service (LCS) server, in responding to a request originating from a LCS client for a location estimate of a mobile terminal coupled to the core network via a controller of the radio access network, the request including a requested accuracy, the radio access network including means for carrying out location measurements of the mobile terminal in response to the request as provided by the LCS server so as to provide a location estimate and an associated accuracy, the apparatus characterized by:
means by which the controller, in response to the request, provides a response indicating the location estimate and including either a binary indicator indicating the associated accuracy relative to the requested accuracy or including the associated accuracy in the same terms as those in which the LCS server provided the requested accuracy in the request.

9. A system, comprising: a core network of a wireless communication system, a mobile terminal, a radio access network for coupling the mobile terminal to the core network, characterized in that the radio access network includes an apparatus as in claim 8.

10. A mobile terminal, equipped so as to communicatively couple to a core network via a controller of a radio access network, the core network including a location communication service (LCS) server, and equipped in particular to receive a response from said radio access network to a request originating from a LCS client for a location estimate of the mobile terminal, the request including a requested accuracy, wherein the response includes a location estimate having an associated accuracy, and the response also includes either a binary indicator indicating the associated accuracy relative to the requested accuracy or includes the associated accuracy in the same terms as those in which the LCS server provided the requested accuracy in the request.

11. A system, comprising: a core network of a wireless communication system, a mobile terminal according to claim 10, and a radio access network for coupling the mobile terminal to the core network and including means for carrying out location measurements of the mobile terminal in response to the request so as to provide the location estimate and the associated accuracy.

12. A system as in claim 11, wherein the radio access network includes an apparatus for use in responding to the request, the apparatus characterized by: means by which the controller, in response to the request, provides the response indicating the location estimate and including either the binary indicator indicating the associated accuracy relative to the requested accuracy or including the associated accuracy in the same terms as those in which the LCS server provided the requested accuracy in the request.

* * * * *